March 30, 1965 J. B. MAJERUS ET AL 3,176,291
SIDE LOBE SUPPRESSION NETWORK
Filed March 2, 1961 3 Sheets-Sheet 2

INVENTORS
JOHN B. MAJERUS
NORTON S. MOST
BY
Moody and Harris
ATTORNEYS

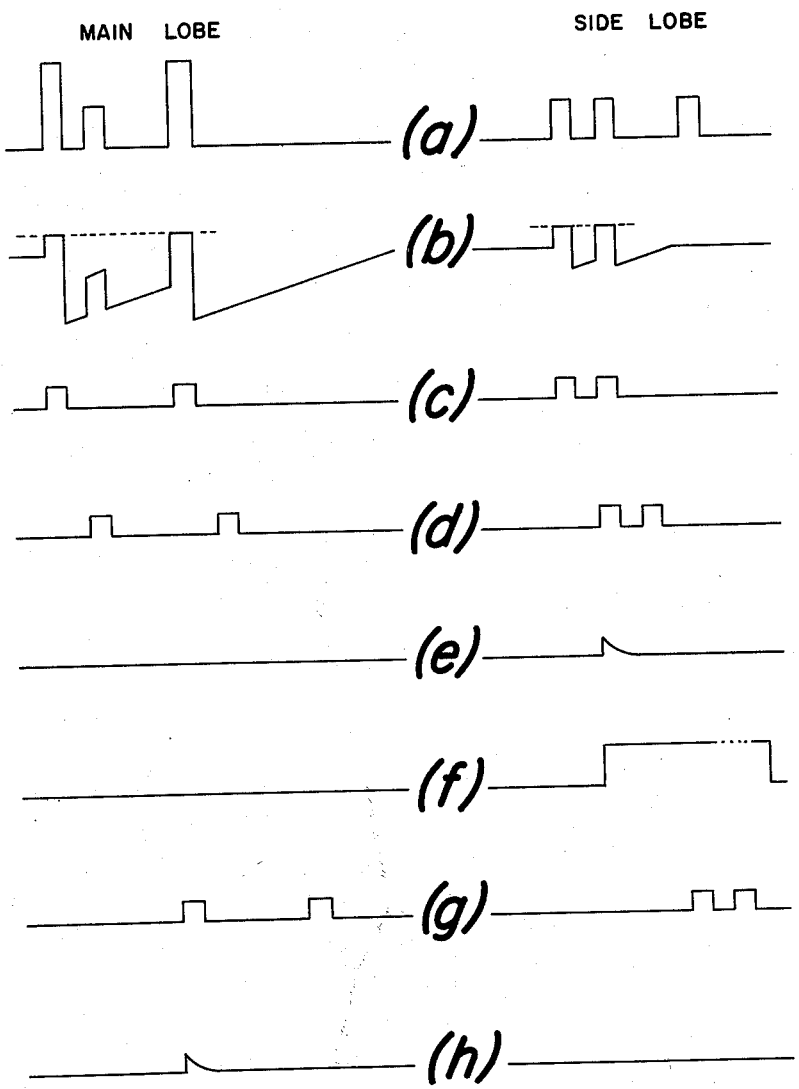

United States Patent Office

3,176,291
Patented Mar. 30, 1965

3,176,291
SIDE LOBE SUPPRESSION NETWORK
John B. Majerus, Marion, and Norton S. Most, Cedar Rapids, Iowa, assignors to Collins Radio Company, Cedar Rapids, Iowa, a corporation of Iowa
Filed Mar. 2, 1961, Ser. No. 92,956
5 Claims. (Cl. 343—6.8)

This invention pertains to a side lobe suppression network and more particularly to a network for use in a transponder for receiving a coded signal having three pulses the first two of which occur timewise adjacent and the third of which occurs at a predetermined time interval after the second, and to reject said coded signal if the first received pulse of said coded signal came from a side lobe of the originating primary radar radiating system.

An antenna system for use with a primary radar transmitter that is capable of producing a suitable coded signal to be received by a transponder of the type contemplated by this invention includes a nondirectional antenna to transmit at least one control pulse and a directional antenna to transmit at least one trigger pulse. The coded signal, or pulse train, is generally transmitted in a particular predetermined manner which, for example, may be by transmitting a pair of timewise spaced trigger pulses from the directional antenna and a control pulse from the nondirectional antenna that timewise closely follows the first trigger pulse. The coded signal thus transmitted may then be received by a transponder and if the coding is that required by the transponder, the signal will be decoded and the transponder will transmit a reply signal. The primary radar system, for example, may be positioned on the ground while the transponder may be mounted in an aircraft and utilized for identification purposes or for deriving other information such as the altitude or bearing of the aircraft.

For a transponder to transmit a return signal, the transmitter therein must be triggered by the received coded signal. This received coded signal, however, is first decoded in the transponder and is rejected unless the pulse train is of the proper coding or spacing.

A major problem existed heretofore in undesirable triggering of the transponder transmitter due to the presence of side lobe pulses from the directional antenna of the primary radar system appearing timewise properly spaced. A side lobe pulse is, however, of much smaller magnitude than is a main lobe pulse. While this characteristic of directional antennas has been utilized heretofore in some devices of this general type to suppress side lobe pulses and thereby eliminate undesirable triggering of the transponder, for example, the side lobe suppression network as taught and claimed in U.S. patent application, Serial Number 35,614, now U.S. Patent No. 3,032,-757, filed June 13, 1960, by John B. Majerus and Floyd M. Totten and assigned to the assignee of the present invention, such devices heretofore have not been capable of receiving a three pulse coded system, wherein the control pulse timewise closely follows the first trigger pulse and precedes the second trigger pulse by a predetermined time interval, and rejecting the coded signal if the first trigger pulse originated from a side lobe of the radiating directional antenna.

It is therefore an object of this invention to provide an improved side lobe suppression network that is capable of receiving a three pulse coded signal wherein the control pulse from a nondirectional antenna closely follows a trigger pulse from a directional antenna and to reject the same if said first trigger pulse is from a side lobe of the originating directional antenna.

More particularly it is an object of this invention to provide a side lobe suppression network capable of receiving a three pulse coded signal wherein the control pulse occurs timewise between said trigger pulses and closely follows said first trigger pulse, comparing the amplitudes of the same, and thereafter rejecting the coded signal if the first trigger pulse originated from a side lobe of a directional antenna.

Still more particularly, it is an object of this invention to provide a side lobe suppression network that includes coincidence means for receiving a pair of trigger pulses from a received three pulse coded signal having a pair of trigger pulses and a control pulse and triggering a transponder transmitter only if the trigger pulses are coincidently received by said coincidence means, and means to compare the first trigger pulse with the control pulse and squelch the second trigger pulse if the first trigger pulse originated from a side lobe of a directional antenna.

With these and other objects in view, which will become apparent to one skilled in the art as the description proceeds, this invention resides in the novel construction, combination and arrangement of parts substantially as hereinafter described and more particularly defined by the appended claims, it being understood that such changes in the precise embodiment of the herein disclosed invention may be submitted as come within the scope of the claims.

The accompanying drawings illustrate one complete embodiment of the invention constructed according to the best mode so far devised for the practical application of the principles thereof, and in which.

Figure 1:
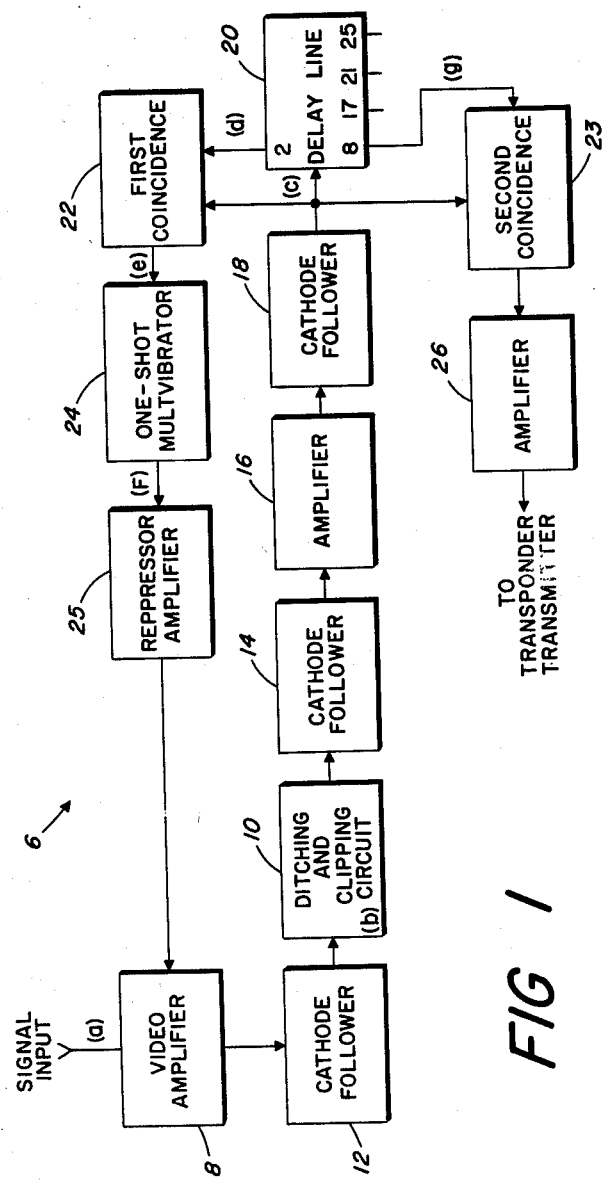
FIGURE 1 is a block diagram illustrating the side lobe suppression network of this invention.

FIGURE 3 is an illustration of the waveforms which might be present at selected stages in the side lobe suppression network of this invention when the received trigger pulses originated from the main lobe of a directional antenna; and FIGURE 4 is an illustration of the waveforms which might be present at selected stages in the side lobe suppression network of this invention when the received trigger pulses are from a side lobe of a directional antenna.

Referring now to the drawings, in which like numerals have been utilized for like chaarcters throughout, the numeral 6 illustrates generally the side lobe suppression network of this invention.

As shown best in FIGURE 1, the coded input signal may be applied to video amplifier 8 and the amplified signal may be coupled therefrom to a ditching and clipping circuit 10 through cathode follower 12.

For the side lobe suppression circuit of this invention, the pulse train that may be received and decoded comprises three pulses, the first of which timewise occurring, must be a trigger pulse (from a directional antenna), the second of which must be a control pulse (from a nondirectional antenna), and must closely follow the first pulse timewise (preferably by two microseconds), and the third of which is preferably, though not necessarily, a trigger pulse and must follow the second pulse by a predetermined time interval (which time interval can preferably be varied by the equipment operator).

It is the purpose of ditching and clipping circuit 10 to compare the first trigger pulse with the control pulse so that at the output of the ditching and clipping circuit the control pulse is effectively repressed, that is, the control pulse is entirely negative and has no positive portion if the first trigger pulse originated from the main lobe of a directional antenna. However, if the first trigger pulse originated from a side lobe of the directional antenna, the control pulse would not be repressed and would, therefore, have a positive portion.

The output from ditching and clipping circuit 10 may be coupled through cathode follower 14 to amplifier 16 and then to another cathode follower 18. The output from cathode follower 18 may then be coupled to delay line 20, to first coincidence means 22, and to second coincidence means 23.

A second input to coincidence means 22 is obtained from delay line 20 such that this second input is delayed a time interval equal to the time interval between the first trigger pulse and the control pulse (preferably two microseconds).

The first pulse and control pulse are thus coincidently received at the first coincidence means 22. If the control pulse has been repressed there will be no coincidence of positive pulses, of course, and there will be no output from the first coincidence means. If, however, the first coincidence means has not been repressed, as would be the case when the first trigger pulse originated from a side lobe of the directional antenna, then two positive pulses would be coincidently received and an output would produced from first coincidence means 22. This output is coupled to a one shot multivibrator 24 triggering the same to generate a blocking or squelching pulse of a time duration greater than the time interval between the control pulse and the second trigger pulse. This output from the multivibrator is applied through repressor amplifier 25 back to video amplifier 8 to thus squelch the second trigger pulse.

Figure 2:
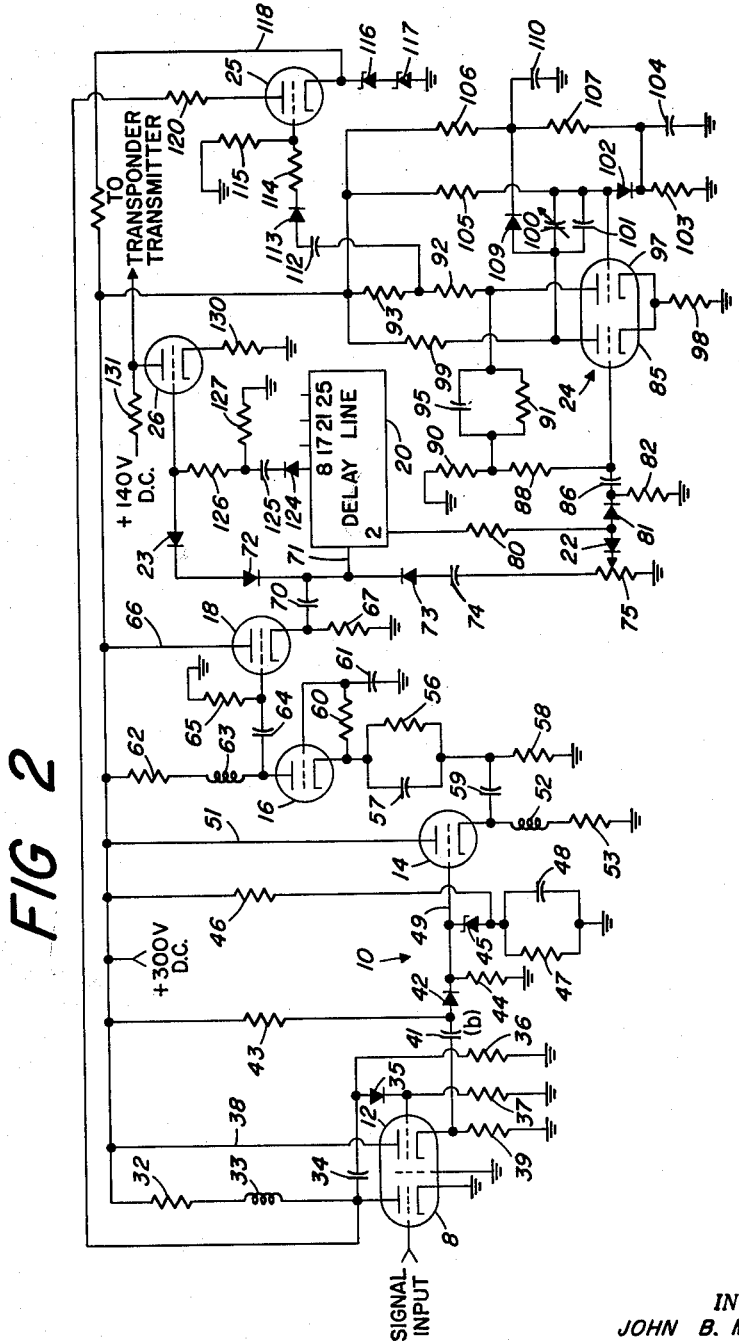
FIGURE 2 is a schematic diagram of the side lobe suppression network of this invention.

If the multivibrator is not triggered, then the second trigger pulse will not be squelched and, of course, will appear in the coded signal applied to second coincidence means 23. A second input to second coincidence means 23 is supplied from delay line 20, delayed a predetermined amount of time depending upon the mode selected, this selection determining the timewise spacing of the last pulse with respect to the first pulse, and may, for example, as shown in FIGURES 1 and 2, be 8, 17, 21 or 25 microseconds. Thus second coincidence means 23 is adapted to coincidently receive the first and second trigger pulses so that if the second trigger pulse has not been squelched, an output is provided. This output may be coupled through amplifier 26 to the transmitter of the transponder (not shown) to trigger the same and thereby cause a reply signal to be sent to the primary radar system.

As shown in FIGURE 2, the coded input signal may be directly applied to the grid of video amplifier 8. Video amplifier 8 may be a triode vacuum tube (or one-half of a dual triode tube if desired) and grounded cathode, while its plate may be connected to a +300 direct voltage power supply through resistor 32 and coil 33. The output from video amplifier 8 may be coupled through blocking capacitor 34 and diode 35 to the grid of cathode follower 12, and diode 35 may be connected with ground at each pole through resistors 36 and 37.

Cathode follower 12 may also be a triode vacuum tube (and may also utilize one-half of a dual triode tube if desired) having its plate directly connected to the 300 volt power supply by means of lead 38 and its cathode returned to ground through resistor 39. In addition, the output to ditching and clipping circuit 10 may be taken directly from the cathode.

Ditching and clipping circuit 10 includes a capacitor 41 one side of which is connected to the cathode of cathode follower 12 and the other side of which is directly connected to the anode of diode 42 and connected to the 300 volt power supply through resistor 43.

The cathode of diode 42 may, in turn, be connected to ground through a resistor 44 and to the cathode of Zener, or breakdown, diode 45. The anode of Zener diode 45 may be connected to the 300 volt power supply through resistor 46 and to ground through an RC network which includes resistor 47 and capacitor 48 connected in parallel.

A negative swing due to the first trigger pulse occurs in ditching circuit 10, and this negative swing is allowed to leak off at a rate such that the control pulse occurring immediately following the trigger pulse will have no positive portion unless the trigger pulse is of comparatively small amplitude (which would be the case, of course, if originating from a side lobe of a directional antenna), as brought out more fully hereinafter. The Zener diode 45 serves to clamp the positive signal at a predetermined maximum. The signal at the output of the ditching and clipping circuit will comprise a positive first trigger pulse but will not have a positive control pulse unless the trigger pulse originated from a side lobe or a directional antenna.

The output from ditching and clipping circuit 10 is coupled by means of lead 49 to the grid of cathode follower 14. Cathode follower 14 may also be a triode vacuum tube and may have its plate directly connected to the 300 volt power supply by means of lead 51 and its cathode returned to ground through serially connected inductor 52 and resistor 53.

Amplifier 16, which may also be a triode vacuum tube, may have its cathode connected to ground through an RC network consisting of resistor 56 and capacitor 57 connected in parallel and resistor 58 connected in series with the RC network, and may have the output from cathode follower 14 coupled to the cathode of the amplifier at the junction between the RC network and resistor 58 through blocking capacitor 59. In addition, the cathode of amplifier 16 may be connected to the grid through a resistor 60, and a bypass condensor 61 may be connected between grid and ground. The plate of amplifier 16 may be connected to the 300 volt power supply through serially connected resistor 62 and inductor 63.

The output from amplifier 16 may be coupled through a blocking capacitor 64 directly to the grid of cathode follower 18, which grid may be returned to ground through resistor 65. Cathode follower 18 may also be a triode vacuum tube and may have its plate directly connected to the 300 volt power supply by means of lead 66, while its cathode may be connected to ground through resistor 67.

The output from cathode follower 18 may be coupled through a blocking capacitor 70 to delay line 20 by means of lead 71. In addition, this same output is also applied to second coincidence means 23 through a diode 72 and to first coincidence means 22 through serially connected diode 73, capacitor 74, and variable resistor 75.

The second input to first coincidence means 22 may be supplied by coupling a signal that has been delayed two microseconds (if the first trigger pulse is timewise spaced from the control pulse two microseconds) from the delay line to the anode of diode 22, which in the preferred embodiment serves as the first coincidence means, through a resistor 80. The anode of diode 22 may be also connected to the anode of diode 81 while the cathode of diode 81 may be connected to ground through a resistor 82 and coupled to the grid of triode 85 of multivibrator 24 through capacitor 86.

The grid of triode 85 may also be connected through resistor 88 to the junction between serially connected resistors 90 and 91 of a voltage divider which also includes serially connected resistors 92 and 93. If desired, a capacitor 95 may be connected in parallel with resistor 91.

Multivibrator 24 may include triode tubes 85 and 97, which tubes may have their cathodes commonly tied to ground through a resistor 98. The plate of triode 85 may be connected to the 300 volt power supply through resistor 99 and may also be connected to the grid of triode 97 through variable capacitor 100 and capacitor 101 connected in parallel. The grid of triode 97 may be connected to ground through diode 102 and resistor 103, the latter of which may be connected in parallel with capacitor 104. In addition, the grid of triode 97 may be connected to the 300 volt power supply through resistor 105. The cathode of diode 102 may be connected to the 300 volt power supply through serially connected resistors 106 and 107, while the plate of triode 85 may be connected to the junction of resistors 106 and 107 through diode 109 and the junction itself may be connected to ground through bypass capacitor 110.

The plate of triode 97 may be connected to the 300 volt power supply through resistors 92 and 93, and the output from multivibrator 24 may be taken from the plate of triode 97 between the junction of resistors 92 and 93. This output may be coupled through serially connected capacitor 112, diode 113, and resistor 114 to the grid of amplifier 25. In addition, the grid of amplifier 25 may be returned to ground through resistor 115. The cathode of amplifier 25 may be connected to ground through a pair of serially connected Zener diodes 116 and 117 and, in addition, the cathode may be directly connected to a 300 volt power supply through resistor 118. The plate of amplifier 25 may be connected to the 300 volt power supply through serially connected resistor 120, coil 33 and resistor 32, while the output may be taken from the plate of the amplifier through resistor 120 and directly applied back to the plate of amplifier 8.

Second coincidence means 23 in addition to receiving the output from cathode follower 18 as brought out hereinabove, also receives an output from delay line 20, which output is delayed a time interval equal to the time interval between the first and last pulse of the train (8 microseconds as shown in FIGURES 1 and 2). If desired, of course, and as shown in FIGURES 1 and 2, this delay could be 8, 17, 21 or 25 microseconds. When the eight microsecond mode has been selected, the output is taken through diode 124, capacitor 125 and resistor 126 and applied to the anode of diode 23 which, as shown in FIGURE 2, may serve as the second coincidence means. If desired, the junction between capacitor 125 and resistor 126 may be returned to ground through a resistor 127.

The output from second coincidence tube 23, that is from the anode of diode 23, may be directly applied to the grid of amplifier 26. The cathode of amplifier 26 may be returned to ground through a resistor 130 and the plate may be connected to a 140 volt power supply through resistor 131. The output from amplifier 26 may be taken directly from the plate and applied to the transmitter (not shown) of the transponder.

In operation, when a coded signal is received by the side lobe suppression network of this invention and the coded signal comprises a pair of trigger pulses separated a predetermined distance as, for example, eight microseconds, and the control pulse follows the first trigger pulse by two microseconds, this signal will (as shown in FIGURES 3a and 4a) be decoded in the following manner. As the first trigger pulse reaches the ditching and clipping circuit 10 capacitor 41 is charged to a maximum voltage governed by the amplitude of the first trigger pulse thereby producing the first positive portion of the circuit output waveform shown in (b) of FIGURES 3 and 4 (the positive output being limited in amplitude to a value of eight volts, for example, by Zener diode 45). At the end of the first trigger pulse, capacitor 41 starts to discharge through resistor 43 thereby producing the circuit output voltage of opposite polarity, as shown by the negative excursion of the waveform of FIGURES 3b and 4b, since the discharge of the capacitor is, of course, in a direction opposite to its charge. This negative voltage has an initial value substantially the same as that of the first trigger pulse (as also shown by FIGURES 3b and 4b). The discharge time of capacitor 41 is controlled primarily by resistor 43 and the value of this resistor is chosen so that the circuit output voltage decreases toward zero gradually. The control pulse closely following the trigger pulse occurs during the recovery period after the negative swing of the ditching circuit. Thus, the magnitude of the first trigger pulse determines whether the control pulse will have a positive portion (as shown in FIGURES 4b and c) or whether it will fall completely in the ditch created by the negative swing and never reach the zero reference (as shown in FIGURES 3b and c). If the trigger pulse originated from a side lobe of the directional antenna the magnitude is not as great as when originating from the main lobe, as brought out hereinabove. Thus, the first trigger pulse can be utilized to repress the control pulse when from a main lobe and also allows said pulse to have a positive portion if from a side lobe.

The output from the ditching circuit is applied to the first coincidence means (as shown by FIGURES 3c and 4c), as is the same output delayed two microseconds (as shown by FIGURES 3d and 4d), so that the first coincidence means coincidently receives both the first trigger pulse and the control pulse if it has not been repressed. Since the coincidence means requires two positive pulses coincidently received to produce an output, if the control pulse has been repressed, as will be the case if the trigger pulse was from a main lobe of the directional antenna, then there will be no output from the first coincidence means (as shown by FIGURE 3e).

However, if the control pulse has not been repressed, as will be the case when the first trigger pulse is from a side lobe of the directional antenna, then the two positive pulses will be coincidently received and an output, as shown by FIGURE 4e, will be produced and this will be coupled to the one shot multivibrator. The multivibrator will then be triggered to produce a blanking pulse, as shown by FIGURE 4f and this output is applied through repressor amplifier 25 back to video amplifier, or input gate, 8 which originally received the coded input signal. The blanking pulse from the multivibrator must at least be of a time duration greater than the spacing between the control pulse and the second trigger pulse and is preferably about 35 microseconds to thus blank the third pulse in all receivable modes. The blanking pulse when applied to the plate of the video amplifier squelches the second trigger pulse and precludes its appearance in the pulse train as it passes through the side lobe suppression network.

The output from the ditching and clipping circuit is also applied to second coincidence means 23 (as shown in FIGURES 3c and 4c), as is the same output delayed a time interval equal to the spacing between the trigger pulses (as shown in FIGURES 3g and 4g). Thus at the second coincidence means, the first and second trigger pulses may be coincidently received. If the second trigger pulse has not been squelched and thereby precluded from appearing in the pulse train, it, of course, will be coupled to the second coincidence means. Since the second coincidence means is then supplied with the required two coincident positive pulses, an output as shown by FIGURE 3h, will be produced. Of course, if the trigger pulses had originated from a side lobe of the directional antenna there would be no second trigger pulse, it having been squelched by the blanking pulse, and no output is produced from the second coincidence means as shown by FIGURE 4h.

The third pulse has been described herein as being from the directional antenna. However, it is to be appreciated, of course, that the third pulse could originate from a non-directional antenna, the only requirements being that it be a positive pulse and be properly spaced with respect to the first pulse of the pulse train.

Particular component values which may be utilized to construct an operable side lobe suppression network as taught by this invention are as follows:

| Numeral | Type | Value |
|---|---|---|
| 8 | Amplifier | ½ 5,670 |
| 12 | Cathode Follower | ½ 5,670 |
| 14 | ----do---- | ½ 5,670 |
| 16 | Amplifier | ½ 5,670 |
| 18 | Cathode Follower | ½ 5,687 |
| 22 | Diode | 1N928 |
| 23 | ----do---- | 1N928 |
| 25 | Amplifier | ½ 5,670 |
| 26 | ----do---- | ½ 5,670 |
| 32 | Resistor | 23.5K |
| 33 | Coil | 5 mh. |
| 34 | Capacitor | 4,700 μμf. |
| 35 | Diode | 1N629 |
| 36 | Resistor | 470 |
| 37 | ----do---- | 47K |
| 39 | ----do---- | 33K |
| 41 | Capacitor | 150 μμf. |
| 42 | Diode | 1N629 |
| 43 | Resistor | 522K |
| 44 | ----do---- | 38.3K |
| 45 | Zener Diode | T.I. 653C9 |
| 46 | Resistor | 316K |
| 47 | ----do---- | 31.6K |
| 48 | Capacitor | 5 μf. |
| 52 | Inductor | 1 mh. |
| 53 | Resistor | 10K |
| 56 | ----do---- | 560 |
| 57 | Capacitor | 470 μμf. |
| 58 | Resistor | 680 |
| 59 | Capacitor | 5 mf. |
| 60 | Resistor | 22K |
| 61 | Condenser | 4,700 μμf. |
| 62 | Resistor | 23.5K |
| 63 | Inductor | 5 mh. |
| 64 | Capacitor | 4,700 μμf. |
| 65 | Resistor | 100K |
| 67 | ----do---- | 10K |
| 70 | Capacitor | 0.1 μf. |
| 72 | Diode | 1N629 |
| 73 | ----do---- | 1N629 |
| 74 | Capacitor | 220 μμf. |
| 75 | Resistor | Variable |
| 80 | ----do---- | 22K |
| 81 | Diode | 1N928 |
| 82 | Resistor | 470K |
| 85 | Triode | ½ 5,670 |
| 86 | Capacitor | 470 μμf. |
| 88 | Resistor | 100K |
| 90 | ----do---- | 6,800 |
| 91 | ----do---- | 100K |
| 92 | ----do---- | 10K |
| 93 | ----do---- | 12K |
| 95 | Capacitor | 20 μμf. |
| 97 | Triode | ½ 5,670 |
| 98 | Resistor | 3,300 |
| 99 | ----do---- | 18K |
| 100 | Capacitor | Variable |
| 101 | ----do---- | 100 μμf. |
| 102 | Diode | 1N629 |
| 103 | Resistor | 4,700 |
| 104 | Capacitor | 0.01 μf. |
| 105 | Resistor | 2 mc. |
| 106 | ----do---- | 5,600 |
| 107 | ----do---- | 47K |
| 109 | Diode | 1N629 |
| 110 | Capacitor | 0.047 μf. |
| 112 | ----do---- | 0.047 μf. |
| 113 | Diode | 1N629 |
| 114 | Resistor | 4,700 |
| 115 | ----do---- | 47K |
| 116 | Zener Diode | T.I. 653C9 |
| 117 | ----do---- | T.I. 653C9 |
| 118 | Resistor | 330K |
| 120 | ----do---- | 3,300 |
| 124 | Diode | 1N629 |
| 125 | Capacitor | 4,700 μμf. |
| 126 | Resistor | 10K |
| 127 | ----do---- | 22K |
| 130 | ----do---- | 39K |
| 131 | ----do---- | 47K |

It is to be appreciated, of course, that the foregoing is illustrative only, and the invention herein is not meant to be limited to the specific components or values listed.

In view of the foregoing it should be readily apparent to those skilled in the art that the side lobe suppression network of this invention provides a suppression network capable of receiving a three pulse coded signal wherein the control pulse closely follows the first trigger pulse and rejecting the entire coded signal if the trigger pulse originated from a side lobe of the directional antenna or if the signal is improperly coded with respect to spacing between said three pulses.

What is claimed as our invention is:

1. A side lobe suppression network for receiving a coded signal comprising three pulses the first of which being a trigger pulse originating from a directional antenna and the second of which being a control pulse originating from a nondirectional antenna and occurring timewise between said trigger pulse and the third pulse, said side lobe suppression network comprising: means for receiving said coded signal and repressing said control pulse if said trigger pulse originated from the main lobe of a directional radiating antenna; a delay line for receiving the output from said first named means; first coincidence means connected with said first named means and with said delay line for coincidently receiving said trigger pulse and said control pulse if not repressed and providing an output signal only if said control pulse has not been repressed; means connected with said first coincidence means to cause the third pulse to be squelched if an output signal is received from said first coincidence means; second coincidence means connected with said first named means and said delay line to coincidently receive said trigger pulse and said third pulse if not squelched and producing an output signal only if said third pulse has not been squelched; and means connected to said second coincidence means for receiving the output signal therefrom.

2. The side lobe suppression network of claim 1 wherein said first and second coincidence means comprise unidirectional conductive devices.

3. A side lobe suppression network for receiving a coded signal having first and second trigger pulses originating from a directional antenna and a control pulse originating from a nondirectional antenna and occurring timewise closely following said first trigger pulse and before said second trigger pulse, said side lobe suppression network comprising: input means including normally open signal gating means for receiving said coded input signal; repressing means connected to said input means for preventing said control pulse from reaching a predetermined minimum magnitude if said first trigger pulse originated from the main lobe of a directional antenna; first coincidence means; means connected to said repressing means for coupling the output therefrom to said first coincidence means; a delay line connected to said last named means for receiving the output from said repressing means; means for coupling an output from said delay line to said first coincidence means, said output being delayed a time interval equal to the time interval between said first trigger pulse and said control pulse; said first coincidence means producing an output signal only when said first trigger pulse and said control pulse are coincidently received and at least as great in magnitude as said predetermined minimum magnitude; a multivibrator connected to said first coincidence means, said multivibrator being triggered to generate a squelching pulse for a predetermined time interval greater than the time interval between said control pulse and said second trigger pulse whenever an output is received from said first coincidence means; means connected to said multivibrator and said signal gating means whereby the output from said multivibrator causes squelching of said second trigger pulse; second coincidence means producing an output only if said first and second trigger pulses are coincidently received; means for coupling the output from said repressing means to said second coincidence means; means for coupling an output signal from said delay line to said second coincidence means, said delay line output signal being delayed with respect to the input signal to said delay line by a time interval equal to the time interval between said trigger pulses; and means connected to the output of said second coincidence means for receiving the output signal therefrom.

4. In a transponder adapted to receive a coded signal having a pair of spaced trigger pulses from a directional antenna and a control pulse from a nondirectional antenna with the control pulse closely following the first trigger pulse and preceding the second trigger pulse, a side lobe suppression network for assuring that said transponder will not be triggered by a side lobe pulse from said directional antenna, said side lobe suppression network comprising: amplifying means for receiving said coded signal; repressing means connected to said amplifying means to receive the output therefrom, said repressing means preventing said control pulse from attaining a predetermined minimum magnitude if said first trigger pulse originated from the main lobe of a directional antenna; first and second coincidence means; said second coincidence means connected to said repressing means to receive the output therefrom; a delay line receiving the output from said repressing means; means for coupling first output signal from said delay line to said second coincidence means, said first output signal being delayed with respect to the input signal to said delay line by a time interval equal to the time interval between said first and second trigger pulses; said second coincidence means providing an output only if said first and second trigger pulses are coincidently applied thereto; means coupling the output from said repressing means to said first coincidence means; means for coupling a second output signal from said delay line to said first coincidence means, said second output signal being delayed with respect to the input signal to said delay line by a time interval equal to the time interval between said first trigger pulse and said control pulse; said first coincidence means providing an output only if said first trigger pulse and said control pulse are coincidently applied to and are of a magnitude at least as great as said predetermined minimum magnitude; a multivibrator connected to said first coincidence means to receive the output therefrom and generate a squelching pulse for a predetermined time interval greater than the time interval between said control pulse and said second trigger pulse; and means for coupling said squelching pulse to said amplifying means to squelch said second trigger pulse whereby said side lobe suppression network rejects all received coded signals whenever said trigger pulses are from a side lobe of a directional antenna.

5. A side lobe suppression network for receiving a coded signal having at least first and second trigger pulses originating from a directional antenna and a control pulse originating from a nondirectional antenna and occurring timewise between said trigger pulses, said side lobe suppression network comprising: input gate means for receiving said coded signal; repressing means connected to said gate means for receiving said coded signal therethrough and passing said control pulse only if the magnitude thereof is comparable to that of said first trigger pulse; said repressing means including a charging capacitor that is charged by said first trigger pulse, and means for allowing slow discharge of said charging capacitor after said first pulse is terminated, the time duration of said discharge being at least equal to the time interval between said first trigger pulse and said control pulse; suppression means connected to said repressing means and said gate means for receiving the output from said repressing means and squelching said second trigger pulse at said input gate means if said first trigger pulse originated from a side lobe of the directional antenna; and means connected to said repressing means to receive the output therefrom and providing an output from said side lobe suppression network only if said second trigger pulse has not been squelched.

References Cited by the Examiner
UNITED STATES PATENTS
3,007,156  10/61  Barber _____ 343—6.8

CHESTER L. JUSTUS, *Primary Examiner.*